(12) United States Patent
Cruz et al.

(10) Patent No.: US 7,415,558 B2
(45) Date of Patent: Aug. 19, 2008

(54) COMMUNICATION STEERING FOR USE IN A MULTI-MASTER SHARED RESOURCE SYSTEM

(75) Inventors: Arnaldo R. Cruz, Austin, TX (US); John J. Vaglica, Austin, TX (US); William C. Moyer, Dripping Springs, TX (US); Tuongvu V. Nguyen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 11/610,956

(22) Filed: Dec. 14, 2006

(65) Prior Publication Data

US 2007/0088889 A1 Apr. 19, 2007

(51) Int. Cl.
*G06F 13/24* (2006.01)
*G06F 13/00* (2006.01)
(52) U.S. Cl. .................. 710/260; 710/38; 710/104; 710/266
(58) Field of Classification Search ............. 710/260, 710/266, 38, 104
See application file for complete search history.

(56) References Cited

U.S. PATENT DOCUMENTS

| | | | |
|---|---|---|---|
| 5,280,585 A | 1/1994 | Kochis et al. | |
| 5,669,002 A | 9/1997 | Buch | |
| 5,887,194 A | 3/1999 | Carson et al. | |
| 6,101,557 A | 8/2000 | Movall et al. | |
| 6,308,239 B1 * | 10/2001 | Osakada et al. | 710/316 |
| 6,408,347 B1 | 6/2002 | Smith et al. | |
| 6,466,998 B1 | 10/2002 | Bennett | |
| 6,480,920 B1 | 11/2002 | Akiyama | |
| 6,546,450 B1 * | 4/2003 | Liu | 710/316 |
| 2003/0182492 A1 * | 9/2003 | Watkins et al. | 711/5 |
| 2003/0233499 A1 | 12/2003 | Choi | |
| 2004/0205280 A1 | 10/2004 | Jeansonne et al. | |
| 2006/0026333 A1 * | 2/2006 | Parr et al. | 710/313 |
| 2006/0080491 A1 * | 4/2006 | Uchizono et al. | 710/313 |

OTHER PUBLICATIONS

Michael J. Mueller, Multiple Processor Interfaces for a USB Device, Jul. 30, 2003.*

* cited by examiner

*Primary Examiner*—Glenn A. Auve
*Assistant Examiner*—Nimesh G Patel
(74) *Attorney, Agent, or Firm*—Susan C. Hill; Joanna G. Chiu

(57) ABSTRACT

New approaches for providing communication between multiple masters (12, 14) and one or more shared resources (24, 30, 100) are needed. One example of a resource that may need to be shared is circuitry complying with the Universal Serial Bus (USB) standard (100). The USB specification defines the use of USB endpoints as data and control channels that reside in a USB device. In some cases it is desirable to have a certain number of endpoints controlled by one processor, and other endpoints controlled by a different processor, thus providing a shared control of all the endpoints. Circuitry (402, 417, 480) may be used to provide steering for additional signals such as interrupts. Other shared resources (24, 30) may use more centralized circuitry (36) to perform a steering function for additional signals.

20 Claims, 4 Drawing Sheets

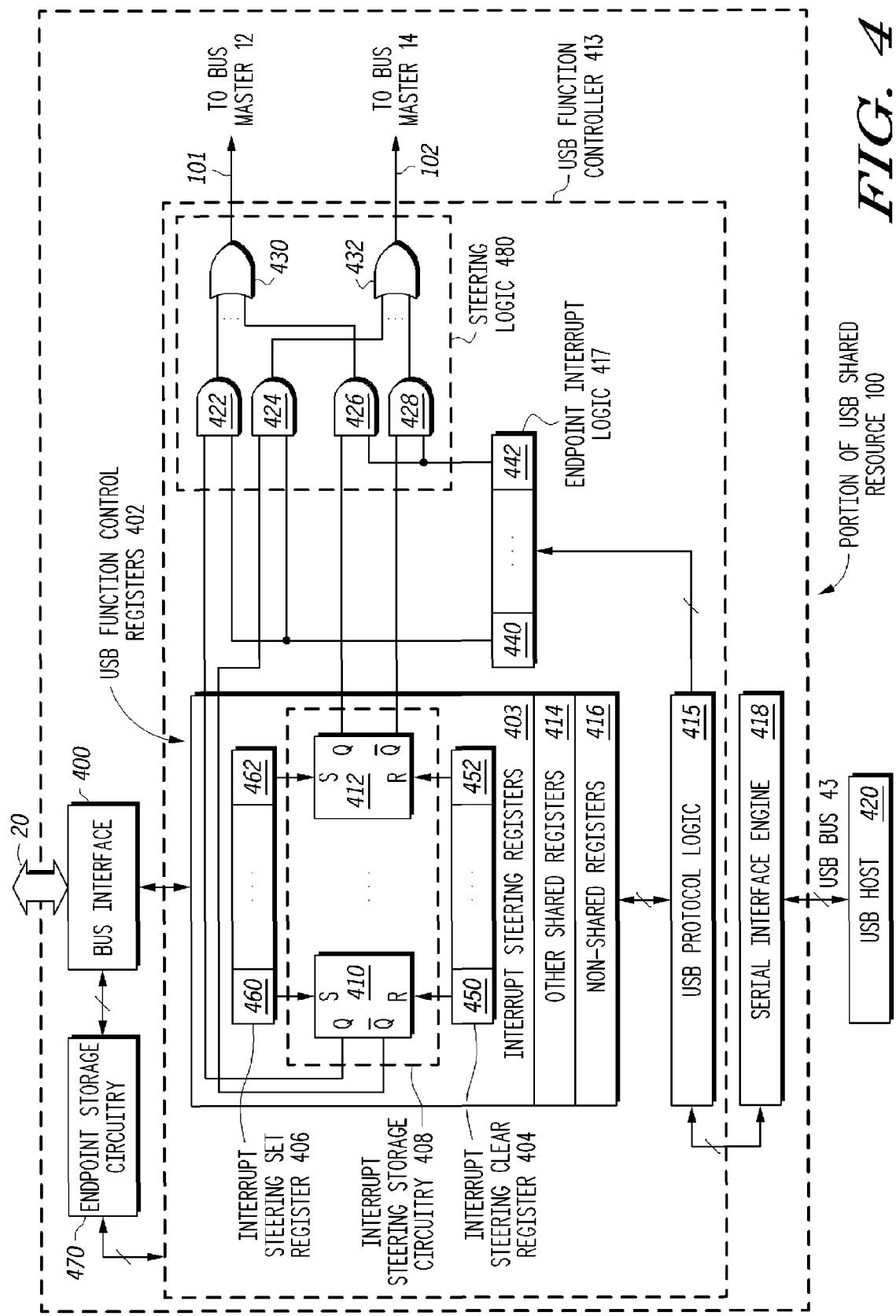

COMMUNICATION STEERING FOR USE IN A MULTI-MASTER SHARED RESOURCE SYSTEM

RELATED APPLICATION

This applicatioin is related to a U.S. patent application Ser. No. 10/682,571, filed Oct. 9, 2003, and entitled "Communication Steering For Use In A Multi-Master Shared Resource System", which is assigned to the current assignee hereof.

FIELD OF THE INVENTION

The present invention relates to communication steering, and more particularly, to communication steering for use in a multi-master shared resource system.

RELATED ART

As multiple bus masters are being used more often in data processing systems, new approaches for providing communication between these multiple masters and one or more shared resources are needed. One example of a resource that may need to be shared is circuitry complying with the Universal Serial Bus (USB) standard. The USB has been defined as a standard by the Universal Serial Bus—Implementers Forum (USB—IF). Unfortunately, the USB standard does not include a mechanism for allowing shared control of endpoints in a multi-master system.

BRIEF DESCRIPTION OF THE DRAWINGS

The present invention is illustrated by way of example and not limited by the accompanying figures, in which like references indicate similar elements, and in which:

FIG. 4 illustrates, in partial block diagram form and partial schematic diagram form, a portion of USB shared resource 100 of FIG. 1 along with other circuitry in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

The USB specification defines the use of USB endpoints as data and control channels that reside in a USB device. The USB endpoints are the source or sink of data and are implemented with memories and additional logic, and controlled by a single processor or microcontroller. In some cases it is desirable to have a certain number of endpoints controlled by one processor, and other endpoints controlled by a different processor, thus providing a shared control of all the endpoints.

Note that the term "shared resource" is used to mean a resource that is potentially accessible by a plurality of bus masters (e.g. bus masters 12, 14). Such a system may allow ownership of a shared resource by one or more of the plurality of bus masters, allowing the owning masters to determine accessibility to the resource by non-owning masters. In one embodiment of the present invention, if a resource is owned by zero masters (i.e. no master), then no master has the right to determine accessibility to that resource by other masters. Accessibility to an unowned resource may be determined in a variety of ways. As one example, any master may have full access to an unowned resource. Alternate embodiments may determine accessibility to an unowned resource in a different manner. In some embodiments, a resource that is not owned by any master allows all masters to potentially claim ownership. Thus for some embodiments, ownership may also be relinquished. In some embodiments of the present invention, if a resource is owned by a plurality of masters, the resource is deemed to be unowned. In alternate embodiments of the present invention, if a resource is owned by a plurality of masters, accessibility to the resource may be determined jointly by the plurality of owning masters.

Figure 1:
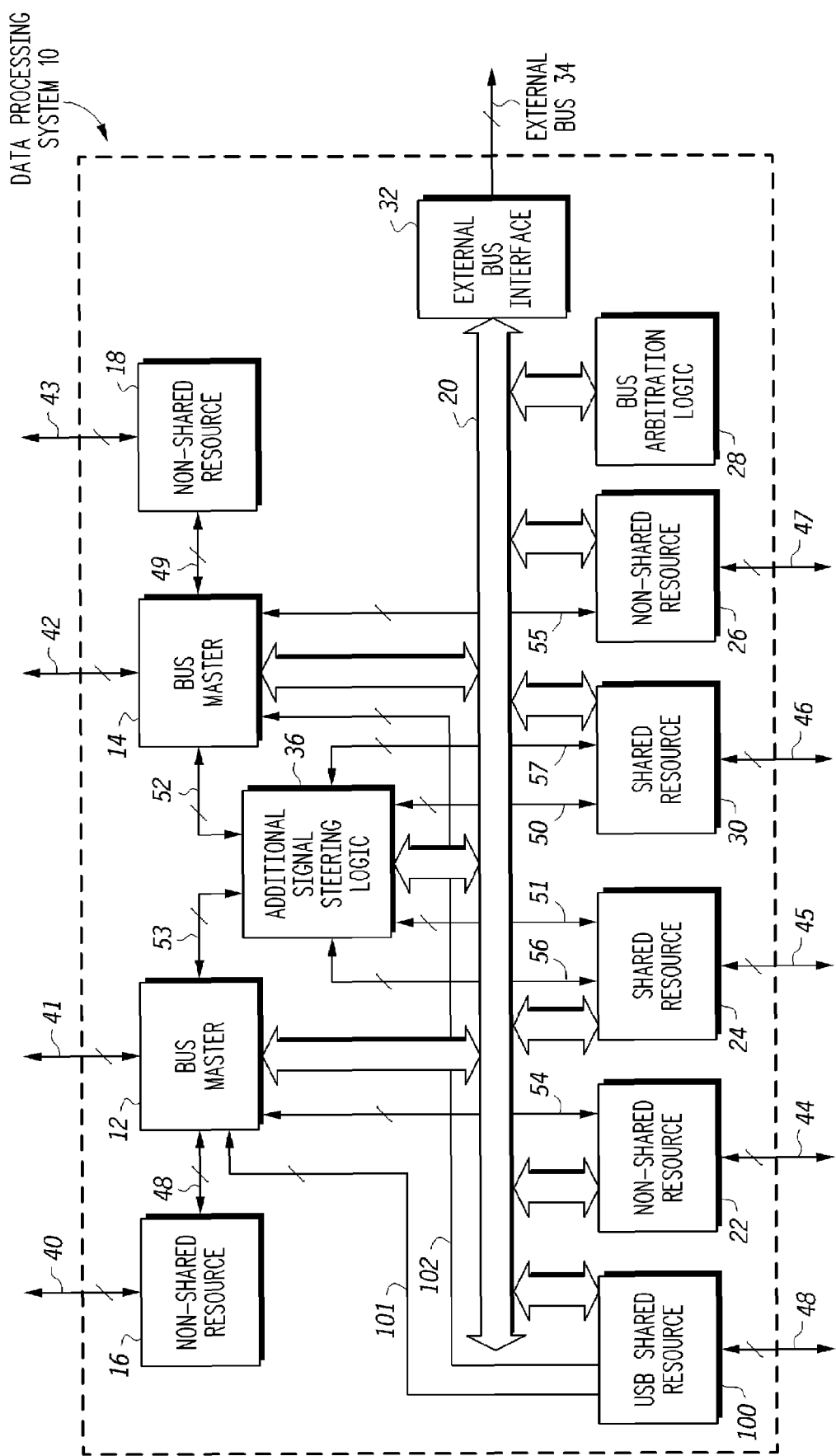
FIG. 1 illustrates, in block diagram form, a data processing system 10 in accordance with one embodiment of the present invention.

FIG. 1 illustrates, in block diagram form, a data processing system 10 in accordance with one embodiment of the present invention. In one embodiment of the present invention, data processing system 10 includes a plurality of bus master 12, 14, a plurality of shared resources 24, 30, 100, and a plurality of non-shared resources 22, 26 which are all bi-directionally coupled to bus 20 to facilitate communication. In the embodiment of FIG. 1, bus masters 12, 14 may represent a single bus master such as a processor, or a sub-system comprising one or more processors as well as supporting circuitry. Note that shared resources 24, 30, 100 may optionally be shared by more than one bus master 12, 14. Non-shared resources 22, 26 are not shared by bus master 12, 14, and thus are only accessed by one of bus masters 12, 14. As used herein, the term "bus" is used to refer to a plurality of signals or conductors which may be used to transfer one or more various types of information, such as data, addresses, control, or status. The terms "conductor" and "signal" are used interchangeably herein. In one embodiment of the present invention, bus 20 is implemented using one or more bus protocols. Bus arbitration logic 28 is used to arbitrate between bus masters 12, 14 to determine which one of the plurality of bus masters 12, 14 have mastership of bus 20.

In some embodiments of the present invention, bus master 12 may be bi-directionally coupled to one or more non-shared resources (e.g. 16) by way of conductors 48, rather than by way of bus 20. Similarly, in some embodiments of the present invention, bus master 14 may be bi-directionally coupled to one or more non-shared resources (e.g. 18) by way of conductors 49, rather than by way of bus 20. In the illustrated embodiment, non-shared resource 16 is accessed only by bus master 12, and not by bus master 14. Likewise, non-shared resource 18 is accessed only by bus master 14, and not by bus master 12. Some embodiments of the present invention include an external bus interface 32 which may couple bus 20 to an external bus 34 which is external to data processing system 10. In one embodiment of the present invention, data processing system 10 is implemented on a single integrated circuit. Alternate embodiments of the present invention may implement data processing system 10 in any manner using any appropriate circuitry.

In some embodiments of the present invention, non-shared resource 16 may be coupled to circuitry external to data processing system 10 by way of one or more terminals 40; bus master 12 may be coupled to circuitry external to data processing system 10 by way of one or more terminals 41; bus master 14 may be coupled to circuitry external to data processing system 10 by way of one or more terminals 42; non-shared resource 18 may be coupled to circuitry external to data processing system 10 by way of one or more terminals 43; USB shared resource 100 may be coupled to circuitry external to data processing system 10 by way of one or more terminals 48; non-shared resource 22 may be coupled to circuitry external to data processing system 10 by way of one or more terminals 44; shared resource 24 may be coupled to circuitry external to data processing system 10 by way of one or more terminals 45; shared resource 30 may be coupled to circuitry external to data processing system 10 by way of one or more terminals 46; and non-shared resource 26 may be coupled to circuitry external to data processing system 10 by way of one or more terminals 47. Alternate embodiments of the present invention may use or not use any combination of terminals 40-48. Terminals 40-48 may be implemented in any available manner.

Still referring to FIG. 1, shared resource 24 may be shared by bus masters 12 and 14. Also, shared resource 24 may be owned by no bus master, or may be owned by either one of bus masters 12 and 14. The USB shared resource 100 may be partitioned so that one or more portions may be shared by bus masters 12 and 14. Also, the USB shared resource 100 may be partitioned so that one or more portions may be owned by no bus master, or may be owned by either one of bus masters 12 and 14. Note that various embodiments of the present invention may allocate ownership of a shared resource, or a portion thereof, in any desired manner after reset. As an example, for one embodiment of the present invention, all portions of the USB shared resource 100 may come out of reset so that a predetermined single bus master (e.g. bus master 12) has ownership.

In the illustrated embodiment of the present invention, additional signal steering logic 36 is used to determine which bus master or bus masters 12, 14 receives which one or more of the additional signals 56, 57. Note that the signals which are included in bus 20 are the signals defined by the bus protocol implemented by bus 20. Additional signals 56, 57 include signals which can be selectively provided to a subset of the bus masters 12, 14 in data processing system 10. Note that in alternate embodiments of the present invention, additional signal steering logic 36 may be used to steer one or more of the bus signals 20 if those one or more bus signals need to be selectively provided to a subset of the bus masters 12, 14. Note that a subset of bus masters 12, 14 may include the full set of all bus masters in certain cases; but generally, additional signals 56, 57 are steered to less than all of the bus masters 12, 14 in data processing system 10. Signals 50 and 51 are used to provide control and/or status for the steering of additional signals 56 and 57.

In the illustrated embodiment of the present invention, additional signal steering logic 36 is coupled to shared resource 30 for receiving and steering additional signals 57. Additional signals 57 include one or more signals that need to be steered, by additional signal steering logic 36, between shared resource 30 and the appropriate bus master 12, 14 by way of signals 53 or 52, respectively. Although additional signals 57 may have any desired function, they are generally signals that should not be approximately simultaneously provided to all bus masters 12, 14, but instead should be provided to only a subset of bus masters 12, 14. One example of an additional signal 57 is an interrupt signal that should only be steered and provided to the bus master which has ownership of shared resource 30 and needs to respond to the interrupt. Other embodiments of the present invention may use additional signal steering logic 36 to steer any desired signals to a subset of the total bus masters (e.g. 12, 14). Some examples of other additional signals that may be steered are reset signals, DMA request and grant signals, mode control signals (e.g. power control modes), custom protocol handshake signals, private message channels, and any other desired signal or signals. Note that for some embodiments of the present invention, there may be embodiments in which one or more of additional signals 57 may be steered to all of the bus masters 12, 14 under selected circumstances. In addition, for some embodiments of the present invention, none, some, or all of signals 52, 53, 56, and 57 may be bi-directional.

Additional signal steering logic 36 is bi-directionally coupled to shared resource 30 by way of signals 50. Signals 50 include one or more signals that are used to provide control and/or status information that is used in the steering of additional signals 57. Alternate embodiments of the present invention may use any types of signals to convey this control and/or status information. Some embodiments of the present invention may not require signals 50, as all necessary control and/or status information resides in additional signal steering logic 36, or is provided to additional signal steering logic 36 in another manner.

In the illustrated embodiment of the present invention, additional signal steering logic 36 is coupled to shared resource 24 for receiving and steering additional signals 56. Additional signals 56 include one or more signals that need to be steered, by additional signal steering logic 36, between shared resource 24 and the appropriate bus master 12, 14 by way of signals 53 or 52, respectively. Although additional signals 56 may have any desired function, they are generally signals that should not be approximately simultaneously provided to all bus masters 12, 14, but instead should be provided to only a subset of bus masters 12, 14. One possible example of an additional signal 56 is an interrupt signal that should only be steered and provided to the bus master which has ownership of shared resource 24 and needs to respond to the interrupt. Other embodiments of the present invention may use additional signal steering logic 36 to steer any desired signals to a subset of the total bus masters (e.g. 12, 14). Note that for some embodiments of the present invention, there may be scenarios in which one or more of additional signals 56 may be steered to all of the bus masters 12, 14 under selected circumstances.

Additional signal steering logic 36 is bi-directionally coupled to shared resource 24 by way of signals 51. Signals 51 include one or more signals that are used to provide control and/or status information that is used in the steering of additional signals 56. Alternate embodiments of the present invention may use any types of signals to convey this control and/or status information. Some embodiments of the present invention may not require signals 51, as all necessary control and/or status information resides in additional signal steering logic 36, or is provided to additional signal steering logic 36 in another manner.

In some embodiments of the present invention, all or a portion of the steering functionality performed by additional signal steering logic 36 may be included as part of the shared resource itself. For example, in the embodiment illustrated in FIG. 1, the steering functionality for signals 101 and 102 is performed by circuitry within the USB shared resource 100, and thus signals 101 and 102 do not need to pass through additional signal steering logic 36 in order to be steered to the correct bus master 12, 14. In the embodiment of the present invention illustrated in FIG. 1, signals 101 may be used to provide one or more additional signals, such as, for example, interrupts, to bus master 12. Similarly, signals 102 may be used to provide one or more additional signals, such as, for example, interrupts, to bus master 14. Alternate embodiments of the present invention may provide signals 101 and 102 to additional signal steering logic 36 in order to have signals 101 and 102 steered to the correct bus master 12, 14 by way of signals 53 and 52, respectively.

In the illustrated embodiment of the present invention, non-shared resource 22 is only accessed by bus master 12; and thus the additional signals associated with non-shared resource 22 are bi-directionally coupled to bus master 12 directly by way of signals 54. There is no need for signals 54 to be steered by additional signal steering logic 36, as signals 54 are only ever provided to a single bus master 12. Similarly, in the illustrated embodiment of the present invention, non-shared resource 26 is only accessed by bus master 14; and thus the additional signals associated with non-shared resource 26 are bi-directionally coupled to bus master 14 directly by way of signals 55. There is no need for signals 55 to be steered by additional signal steering logic 36, as signals 55 are only ever provided to a single bus master 14.

Figure 2:
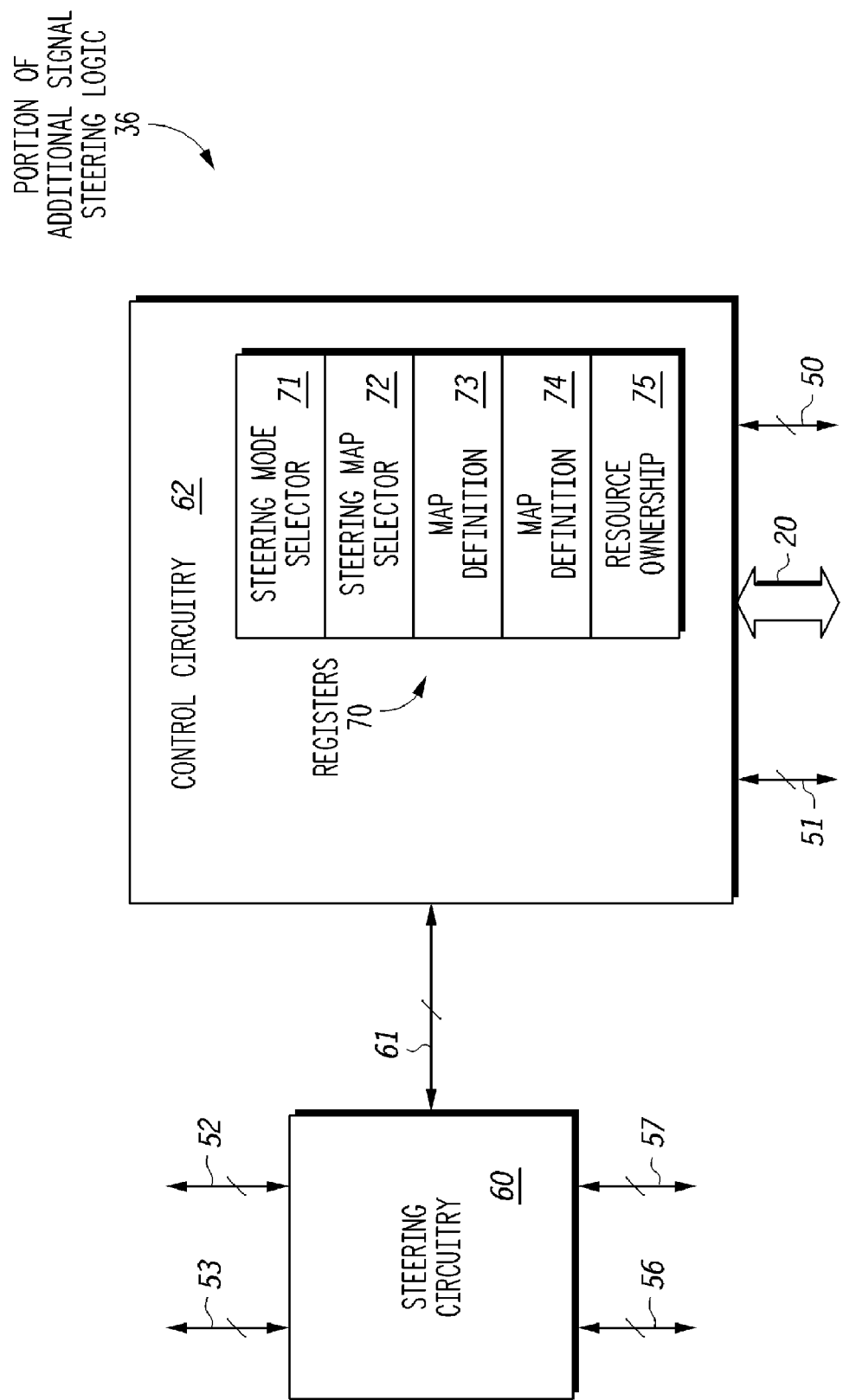
FIG. 2 illustrates, in block diagram form, a portion of additional signal steering logic 36 of FIG. 1 in accordance with one embodiment of the present invention.

FIG. 2 illustrates, in block diagram form, a portion of additional signal steering logic 36 of FIG. 1 in accordance with one embodiment of the present invention. In the illustrated embodiment, additional signal steering logic 36 includes steering circuitry 60 which performs the actual steering function for signals 56 and 57. Signals 56 and 57 may be steered to either bus master 12 by way of signals 53, or to bus master 14 by way of signals 52. Signals 50 and 51 provide information from shared resources 30 and 24, respectively. Signals 50 and 51, along with other control information provided to or stored in control circuitry 62 are used to control the steering function performed by steering circuitry 60.

Control circuitry 62 includes registers 70. In one embodiment of the present invention, registers 70 include a steering mode selector register 71, a steering map selector register 72, a map definition register 73, a map definition register 74, and a resource ownership register 75. Alternate embodiments of the present invention may use more, fewer, or different registers to provide a portion of the control information for controlling steering circuitry 60. In one embodiment of the present invention, some or all of registers 70 are software programmable registers that may be read and written by at least one of bus masters 12 and 14.

Any desired routing scheme may be used for steering additional signals 56 and 57 to the desired one or more of bus masters 12, 14. However, in the illustrated embodiment of the present invention, there is at least one steering mode selector register 71 for each shared resource 24, 20, at least one steering map selector register 72 for each shared resource 24, 20, and there is at least one map definition register 73, 74. Each steering mode selector register 71 may be used to select one of a plurality of steering modes for its corresponding shared resource 24, 30. The selected steering mode may then require use of a map definition stored in one of map definition registers 73, 74 to determine which one or more bus masters 12, 14 should receive the signal being steered by steering circuitry 60. Each steering map selector register may be used to select one of a plurality of map definition registers 73, 74.

In one embodiment of the present invention, additional signals 56 and 57 may be routed to bus masters 12, 14 in a plurality of ways, depending upon the steering mode that has been selected, and optionally depending upon a map definition stored in map definition registers 73, 74. For example, one steering mode may steer the additional signal (e.g. 56) so that it is provided to the bus master (e.g. 12) which currently has ownership of the shared resource (e.g. 24). A map definition register is not needed for this steering mode. A second steering mode may steer the additional signal 56, 57 so that it is provided to one or more bus masters 12, 14, as determined by a programmable route map, stored in one of map definition registers 73, 74. The programmable route map may be programmed by one or more bus masters 12, 14. In some embodiments of the present invention, only the master having ownership of the shared resource 24, 30 may write, and thus change, the map definition register 73, 74 corresponding to that shared resource 24, 30. Alternate embodiments of the present invention may control the programming of one or more map definition in a different manner.

A third steering mode may steer the additional signal (one of 56 or 57) so that it is provided to one or more bus masters 12, 14, as determined by one of a plurality of programmable route maps stored in map definition registers 73, 74. The programmable route map may be selected based upon which bus master 12, 14 currently has ownership of the shared resource 24, 30 that is providing or associated with the additional signal 56, 57. In some embodiments of the present invention, only the bus master having ownership of the shared resource 24, 30 may write, and thus change, the map definition register 73, 74 corresponding to that shared resource 24, 30. Alternate embodiments of the present invention may control the programming of one or more map definition in a different manner.

A fourth steering mode may steer the additional signal (one of 56 or 57) so that it is provided to one or more bus masters 12, 14, as determined by one of a plurality of programmable route maps stored in map definition registers 73, 74. The programmable route map may be selected based upon a current state of the shared resource 24, 30 that is providing or is associated with the additional signal 56, 57. In some embodiments of the present invention, the map definition registers 73, 74 may be static maps corresponding to each of several states of the shared resource 24, 30. In other embodiments of the present invention, the map definition registers 73, 74 may be programmable by one or more bus master 24, 30 (e.g. the owning master). In some embodiments of the present invention, only the bus master having ownership of the shared resource 24, 30 may write, and thus change, the map definition register 73, 74 corresponding to that shared resource 24, 30. Alternate embodiments of the present invention may control the programming or establishment of one or more map definition in a different manner.

A fifth steering mode may steer the additional signal (one of 56 or 57) so that it is provided to one or more bus masters 12, 14, as determined by one of a plurality of programmable route maps stored in map definition registers 73, 74. The programmable route map may be selected by the shared resource 24, 30 that is providing or associated with the additional signal 56, 57. In some embodiments of the present invention, only the shared resource 24, 30 itself may write, and thus change, the map definition register 73, 74 corresponding to that shared resource 24, 30. Alternate embodiments of the present invention may control the programming of one or more map definition in a different manner.

Alternate embodiments of the present invention may use any desired configuration for the control circuitry 62 used to control steering circuitry 60. Alternate embodiments of control circuitry 62 may have no, fewer, more, or different registers 70. Control circuitry 62 is bi-directionally coupled to steering circuitry 60 by way of signals 61. Control circuitry 62 is bi-directionally coupled to bus 20 so that registers 70 may be read and written, for example by one or more of bus masters 12, 14. In one embodiment of the present invention, signals 50, 51 provide information regarding which shared resource 24, 30 is providing or associated with the signal 56, 57, which steering mode to use, and which map definition to use. In alternate embodiments of the present invention, signals 50, 51 provide information regarding which shared resource 24, 30 is providing or associated with the signal 56, 57, and registers 70 are used to provide the rest of the steering mode and map definition information to steering circuitry 60.

Figure 3:
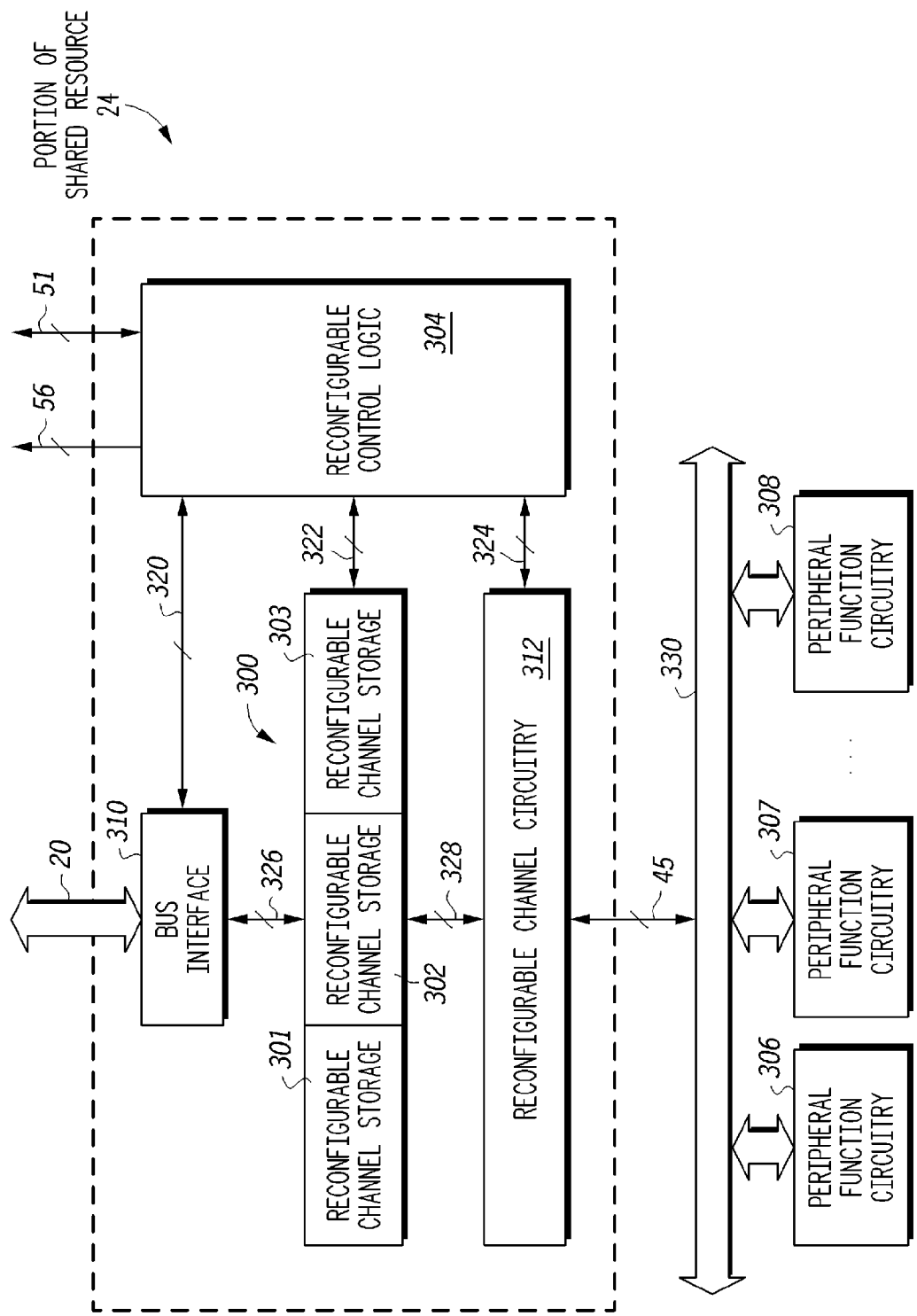
FIG. 3 illustrates, in block diagram form, a portion of shared resource 24 of FIG. 1 along with other circuitry in accordance with one embodiment of the present invention.

FIG. 3 illustrates, in block diagram form, a portion of shared resource 24 of FIG. 1 along with other circuitry in accordance with one embodiment of the present invention. In the illustrated embodiment of the present invention, shared resource 24 includes a bus interface 310 which is bi-directionally coupled to bus 20. Bus interface 310 is bi-directionally coupled to reconfigurable control logic 304 by conductors 320 and is bi-directionally coupled to reconfigurable channel storage circuitry 300 by conductors 326 so that registers and other circuitry within 304 and 300 may be read and/or write accessible by way of bus 20. In one embodiment, reconfigurable channel storage circuitry 300 includes reconfigurable channel storage circuitry 301-303. Alternate embodiments of the present invention may have fewer, more, or the same number of reconfigurable channel storage circuits 301-303 within reconfigurable channel storage circuitry 300. Reconfigurable channel storage circuitry 300 is bi-directionally coupled to reconfigurable control logic 304 by way of conductors 322. In one embodiment of the present invention, signals 322 are used to transfer control and/or status information between reconfigurable channel storage circuitry 300 and reconfigurable control logic 304. Reconfigurable channel storage circuitry 300 is bi-directionally coupled to reconfigurable channel circuitry 312 by way of signals 328. Reconfigurable channel circuitry 312 is bi-directionally coupled to reconfigurable control logic 304 by way of conductors 324. Reconfigurable channel circuitry 312 is bi-directionally coupled to bus 330 by way of conductors 45.

In the embodiment of the present invention illustrated in FIG. 3, there is one reconfigurable channel storage circuit 301-303 for each peripheral function circuit 306-308. Alternate embodiments of the present invention may have any number of reconfigurable channel storage circuits 301-303 for each peripheral function circuit 306-308. Each peripheral function circuit 306-308 may perform one or more of any type of desired function, such as, for example, a timer function, a communication function, a conversion function, a data processing function, a storage function, etc. In addition, in some embodiments of the present invention, reconfigurable channel circuitry 312 includes reconfigurable circuitry to perform one or more of any type of desired function, such as, for example, a timer function, a communication function, a conversion function, a data processing function, a storage function, etc. Thus the circuitry for performing a function may be located on the same integrated circuit as the shared resource 24 (e.g. can be located in reconfigurable channel circuitry 312), or alternately may be located outside of the integrated circuit incorporating the shared resource 24 (e.g. can be located in any of peripheral function circuits 306-308).

In the embodiment of the present invention illustrated in FIG. 3, reconfigurable control logic 304 is used to provide signals 56 and signals 51 to additional signal steering logic 36 (see FIG. 1). Reconfigurable control logic 304 is also used to determine or select the communication path being used from one of the bus masters 12, 14 to one or more of the peripheral function circuits 306-308. The communication path uses bus 20, bus interface 310, one of reconfigurable channel storage circuits 301-303 (which one is determined by reconfigurable control logic 304), reconfigurable channel circuitry 312, signals 45, and bus 330.

Note that in one embodiment of the present invention, reconfigurable channel circuitry 312 is used to determine or select the communication path between reconfigurable channel storage circuitry 300 and peripheral function circuits 306-308. In some embodiments of the present invention, reconfigurable channel circuitry 312 is programmed via reconfigurable control logic 304. In alternate embodiments of the present invention, reconfigurable channel circuitry 312 may be programmed by bus master 12 or 14 via bus interface 310. In some embodiments of the present invention, reconfigurable channel storage circuitry 300 may function solely as storage circuitry which can be reconfigured by reconfigurable control logic 304. Similarly, reconfigurable channel circuitry 312 may function solely to perform a desired function, where the function is selectable by reconfigurable control logic 304. Alternate embodiments of the present invention may partition the storage, function, and control portions of shared resource 24 in any manner. Note that alternate embodiments of the present invention may not use reconfigurable channel circuitry 312; instead, reconfigurable control logic 304 may be directly used to determine or select the communication path between reconfigurable channel storage circuitry 300 and peripheral function circuits 306-308.

FIG. 4 illustrates, in block diagram form, a portion of USB shared resource 100 of FIG. 1 along with other circuitry in accordance with one embodiment of the present invention. In one embodiment, USB shared resource 100 complies with the Universal Serial Bus (USB) standard and communicates with a USB host 420 by way of a USB bus 43. USB shared resource 100 is also coupled to bus 20. In the embodiment of the present invention illustrated in FIG. 4, USB shared resource 100 includes a USB function controller 413 which is bi-directionally coupled to endpoint storage circuitry 470 and to bus interface 400. Bus interface 400 is bi-directionally coupled to endpoint storage circuitry 470 and is bi-directionally coupled to bus 20. In one embodiment of the present invention, USB function controller 413 is bi-directionally coupled to serial interface engine 418 by way of USB protocol logic 415. Serial interface engine 418 is bi-directionally coupled to USB bus 43.

In one embodiment of the present invention, USB function controller 413 includes a plurality of USB function control registers 402 which are coupled to USB protocol logic 415. USB protocol logic 415 is coupled to endpoint interrupt logic 417 to provide interrupt information regarding when an interrupt should be provided to a bus master 12, 14. Steering logic 480 receives information from endpoint interrupt logic 417 and USB function control register 402 and, in response, provides interrupt signals 101 and 102 to bus masters 12 and 14, respectively. Unlike shared resource 24 (see FIG. 1) which uses additional signal steering logic 36 to determine which bus master 12, 14 receives which additional signals, USB shared resource 100 includes the circuitry for performing the steering function. As a result, signals 101 and 102 do not need to be routed through additional signal steering logic 36. The steering function provided by additional signal steering logic 36 is performed within USB shared resource 100.

In one embodiment of the present invention, steering logic 480 includes AND gates 422, 424, 426, and 428 which each have one input coupled to USB function control registers 402 and one input coupled to endpoint interrupt logic 417. Steering logic 480 also includes a plurality of OR gates 430, 432 which receive inputs from AND gates 422, 424, 426, and 428 and which provide outputs 101 and 102 to bus masters 12, 14 respectively.

In one embodiment of the present invention, each endpoint has a corresponding bit 460 or 462, a corresponding latch 410 or 412, a corresponding bit 450 or 452, and a corresponding portion of endpoint interrupt logic 440 or 442. Note that the specific circuitry illustrated in FIG. 4 is merely shown for illustrative purposes. Alternate embodiments of the present invention may use any appropriate circuitry to implement the steering functionality needed by USB function controller 413.

In one embodiment of the present invention, USB function control registers 402 include interrupt steering registers 403, other shared registers 414, and non-shared registers 416. In one embodiment of the present invention, interrupt steering registers 403 include interrupt steering set register 406 and interrupt steering clear register 404 which are coupled to interrupt steering storage circuitry 408 to provide set and reset signal signals, respectively, to set/reset latches 410, 412. Alternate embodiments of the present invention may include a plurality of other shared registers 414 which are implemented using a set register, a clear register, and a plurality of set/reset latches in a manner similar to that used to implement the interrupt steering registers 403.

Note that through the use of shared registers 403 and 414, endpoint interrupt logic 417, and steering logic 480, the USB function controller 413 has the capability to allow shared control of endpoints in a multi-master system. Although the multi-master system illustrated in FIG. 1 uses two bus masters 12, 14, alternate embodiments of the present invention may use any number or type of bus master, including bus masters external to data processing system 10.

The functionality of the USB shared resource 100 will now be described in further detail. USB protocol logic 415 provides and receives data to and from serial interface engine 418. Serial interface engine 418 provides and receives data to and from USB host 420 and functions according to the USB standard.

In one embodiment of the present invention, USB shared resource 100 is considered to be a shared resource that is unowned. However, the USB shared resource 100 is partitioned so that one or more portions (e.g. USB endpoints) may be allocated to different bus masters 12 and 14. In one embodiment of the present invention, the USB endpoints may be stored in the endpoint storage circuitry 470. In one embodiment of the present invention, interrupt steering register 403 has been added to steer endpoint interrupts to one of a plurality of bus masters 12, 14.

In the illustrated embodiment of the present invention, interrupt steering register 403 has been implemented using an interrupt steering set register 406, and interrupt steering clear register 404, and interrupt steering storage circuitry 408. In the illustrated embodiment, only two logic states are available to specify selection of the bus master 12, 14 to receive the interrupt. Thus for the illustrated embodiment, endpoint interrupts may be steered to one of only two bus masters 12, 14. Alternate embodiments of the present invention, however, may implement interrupt steering register 403 so that endpoint interrupts may be steered to more than two bus masters. Note that in the illustrated embodiment of the present invention, interrupt steering set register 406 and interrupt steering clear register 404 are both registers in the memory map/ programmer's model and can be written by way of bus 20 and bus interface 400. Note that the reading of registers 406 and 404 is not used in the illustrated embodiment of the present invention; however, alternate embodiments of the present invention may handle the reading of registers 406 and 404 in any desired manner.

In one embodiment of the present invention, both bus masters 12 and 14 can write and modify the shared registers 414 and the interrupt steering register 403. Note that this may result in corruption of the contents of registers 414 and 403. The use of a separate interrupt steering set register 406 located at a unique address in the memory map/programmer's model and use of a separate interrupt steering clear register 404 located at a different address in the memory map allows multiple bus master 12, 14 to independently set or clear selected bits in register 403 without affecting non-selected bits in register 403. Note that for some embodiments of the present invention, one or more of other shared registers 414 may be implemented in a similar manner to register 403 (i.e. using separate set and clear registers 406, 404). For example, all or a portion of other shared registers 414 which relate to endpoint operation may be implemented in a similar manner to register 403. Alternate embodiments of the present invention may use different mechanisms to avoid corruption of the contents of register 401 and one or more of registers 414. One example of such a mechanism is atomic read-modify-write accesses to register 402 and 414.

In the illustrated embodiment of the present invention, writing a "1" to bit 460 will set the corresponding latch 410 and writing a "0" to bit 460 will have no effect on latch 410. Similarly, writing a "1" to bit 450 will clear the corresponding latch 410 and writing a "0" to bit 450 will have no effect on latch 410. Note that this mechanism allows bitwise control of register 403 by both bus master 12 and bus master 14. In some applications using USB shared resource 100, bus master 12 will set a portion of register bits 403 and bus master 14 will clear a different non-overlapping portion of register bits 403. In this case, a "1" in a bit of register 403 steers the corresponding endpoint interrupt to bus master 12, and a "0" in a bit of register 403 steers the corresponding endpoint interrupt to bus master 14.

For one embodiment of the present invention, the non-shared registers 416 do not need to be modified to operate properly with multiple bus masters 12, 14. For example, some register in non-shared registers 416 may be read only, and other registers in non-shared registers 416 may be accessed by one bus master 12, 14 as specified by a predetermined software convention.

In one embodiment of the present invention, USB protocol logic 415 and endpoint interrupt logic 417 do not have to be modified for multiple-master use. However, the interrupt outputs provided by endpoint interrupt logic 417 now have to be steered by steering logic 480 to the bus master specified by a corresponding bit of register 403. Steering logic 480 may be implemented in any manner; the circuitry illustrated in FIG. 4 is just one possible implementation of steering logic 480. Note that steering logic 480 would not be required if only one bus master (e.g. 12 or 14) was utilizing the USB shared resource 100. In that case, no steering would be required, as all interrupts would go to the one bus master.

The remaining circuitry illustrated in FIG. 4 may function in the same manner as standard USB circuitry.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. Circuitry comprising:
   a bus interface which communicates with a first master and a second master;
   endpoint storage circuitry, coupled to the bus interface, the endpoint storage circuitry comprising a plurality of data endpoints wherein each of the plurality of data endpoints is allocatable to one of the first master and the second master;
   a serial interface engine which communicates with a USB host;
   a USB function controller, coupled to the bus interface, endpoint storage circuitry, and serial interface engine, the USB function controller comprising:
      USB protocol logic, coupled to the serial interface engine;
      endpoint interrupt logic which generates interrupts based on information received from the USB protocol logic;
      interrupt steering registers, accessible by both the first master and the second master; and
      interrupt steering logic which routes each of the interrupts to a corresponding one of the first master and the second master based on steering information provided by the interrupt steering registers; and
   a resource ownership register, coupled to the first master and the second master, the resource ownership register allowing the first master to control a control endpoint under a first condition and allowing the second master to control the control endpoint under a second condition, wherein the first master and the second master are not USB hosts.

2. Circuitry as in claim 1, wherein the plurality of data endpoints are allocated based on the interrupt steering registers.

3. Circuitry as in claim 2, wherein, for each of the plurality of data endpoints, the interrupt steering registers indicate allocation to one of the first master and the second master.

4. Circuitry as in claim 2, wherein the interrupt steering registers comprise an interrupt steering set register and an interrupt steering clear register.

5. Circuitry as in claim 4, wherein the interrupt steering registers further comprise interrupt steering storage circuitry coupled to the interrupt steering set register and the interrupt steering clear register, the interrupt steering storage circuitry providing the steering information to the interrupt steering logic.

6. Circuitry as in claim 5, wherein the interrupt steering storage circuitry comprises a plurality of set-reset latches.

7. Circuitry comprising:
   a plurality of data endpoints wherein each of the plurality of endpoints is allocatable to one of a plurality of bus masters, wherein the plurality of bus masters are not USB hosts;
   a control endpoint wherein the control endpoint is allocated to a first one of the plurality of bus masters under a first condition, and wherein the control endpoint is allocated to a second one of the plurality of bus masters under a second condition;
   a USB function controller, coupled to the plurality of endpoints, the USB function controller comprising:
      endpoint interrupt logic which generates interrupts based on communication from a USB host;
      at least one interrupt steering register accessible by the plurality of bus masters; and
      interrupt steering logic which routes each of the interrupts to a corresponding bus master of the plurality of bus masters based on steering information provided by the interrupt steering registers.

8. Circuitry as in claim 7, wherein the at least one interrupt steering register comprises an interrupt steering set register and an interrupt steering clear register.

9. Circuitry as in claim 8, wherein the at least one interrupt steering registers further comprise interrupt steering storage circuitry coupled to the interrupt steering set register and the interrupt steering clear register, the interrupt steering storage circuitry providing the steering information to the interrupt steering logic.

10. A method, comprising:
    providing a USB bus interface for communicating with a USB host;
    providing a first bus master and a second bus master that are not USB hosts;
    providing a plurality of USB endpoints wherein the plurality of USB endpoints comprise a control endpoint and a first data endpoint, wherein the control endpoint is allocated to the first bus master under a first condition and wherein the control endpoint is allocated to the second bus master under a second condition, and wherein the first data endpoint is allocated to the first bus master under a third condition and wherein the first data endpoint is allocated to the second bus master under a fourth condition;
    providing an interrupt steering register that is modifyable by the first bus master and that is modifyable by the second bus master;
    providing a mechanism to avoid corruption of contents of the interrupt steering register due to the interrupt steering register being modifyable by both the first bus master and by the second bus master;
    using the interrupt steering register to determine if the first bus master is to receive an interrupt; and
    using the interrupt steering register to determine if the second bus master is to receive the interrupt.

11. A method as in claim 10, wherein the mechanism to avoid corruption of contents of the interrupt steering register comprises bitwise control of the interrupt steering register by the first bus master and the second bus master.

12. A method as in claim 10, wherein the mechanism to avoid corruption of contents of the interrupt steering register comprises an atomic read-modify-write access.

13. A method as in claim 10, wherein the plurality of USB endpoints reside in a USB device, the method further comprising:
    if the USB device is unowned, allowing both the first bus master and the second bus master to access the interrupt steering register;
    if the USB device is owned by the first bus master, allowing the first bus master and not the second bus master to access the interrupt steering register; and
    if the USB device is owned by the second bus master, allowing the second bus master and not the first bus master to access the interrupt steering register.

14. A method as in claim 10, wherein the first condition and the third condition are a reset condition.

15. A method as in claim 10, wherein the plurality of USB endpoints reside in a USB device, the method further comprising:
    forming the first bus master, the second bus master, and the interrupt steering register on a single integrated circuit, wherein the first bus master has ownership of the USB device coming out of reset.

16. A method as in claim 10, further comprising:
    providing the interrupt steering register in the memory map/programmer's model.

17. A method as in claim 10, wherein the step of providing an interrupt steering register comprises:
    providing an interrupt steering set register; and
    providing an interrupt steering clear register.

18. A method as in claim 10, wherein each of the plurality of USB endpoints is allocatable to the first bus master under software control and is allocatable to the second bus master under software control.

19. A method as in claim 10, wherein the plurality of USB endpoints comprise the first data endpoint and a second data endpoint, and wherein the first data endpoint can be allocated to the first bus master while the second data endpoint is allocated to the second bus master.

20. A method as in claim 10, further comprising:
    providing a non-USB bus interface for communicating with the first bus master and the second bus master;
    providing a serial interface engine which communicates with the USB host by way of the USB bus interface;
    providing USB protocol logic;
    providing USB endpoint interrupt logic which generates interrupts based on information received from the USB protocol logic; and
    providing interrupt steering logic which routes the interrupts based on steering information provided by the interrupt steering register.

* * * * *